United States Patent
Osen et al.

(10) Patent No.: US 8,733,652 B2
(45) Date of Patent: May 27, 2014

(54) METHOD AND APPARATUS FOR COMMUNICATING BETWEEN A SECURITY MODULE AND A HOST DEVICE

(75) Inventors: Karl Osen, Cheseaux-sur-Lausanne (CH); Ernest Odoom, Geneva (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 67 days.

(21) Appl. No.: 13/298,774

(22) Filed: Nov. 17, 2011

(65) Prior Publication Data

US 2012/0126009 A1    May 24, 2012

Related U.S. Application Data

(60) Provisional application No. 61/414,909, filed on Nov. 18, 2010.

(51) Int. Cl.
  *G06K 7/06* (2006.01)
(52) U.S. Cl.
  USPC .......................................................... 235/441
(58) Field of Classification Search
  USPC ........................................ 235/435, 441, 439
  See application file for complete search history.

(56) References Cited

U.S. PATENT DOCUMENTS

| | | |
|---|---|---|
| 5,436,803 A | 7/1995 | Annis et al. |
| 6,223,298 B1 | 4/2001 | Tellier et al. |
| 6,402,032 B1 * | 6/2002 | Huang et al. .................. 235/441 |
| 7,351,919 B1 | 4/2008 | Knoke et al. |
| 7,542,534 B2 * | 6/2009 | Ebert ............................ 375/354 |
| 2011/0221572 A1 * | 9/2011 | Wang et al. .................. 340/10.1 |

FOREIGN PATENT DOCUMENTS

WO    WO 2005/106953    11/2005

OTHER PUBLICATIONS

European Office Action issued in EP 10 19 1635, dated May 19, 2011.
U.S. Appl. No. 13/298,785, electronically captured.

* cited by examiner

*Primary Examiner* — Christle I Marshall
(74) *Attorney, Agent, or Firm* — DLA Piper LLP US

(57) ABSTRACT

The present invention may be deployed in an interface between a security module (CH) housed on a chip card (CC) and a host device (HST) comprising a chip card reader (RDR). In the case where the security module (CH) operates at frequencies which are high enough to generate unwanted electromagnetic interference, the invention allows for a substantial reduction in such interference by providing a converter module (CVT) which allows the host device to operate at lower frequencies while a limited number of short, shielded connections are used to interface with the security module (CH).

10 Claims, 2 Drawing Sheets

METHOD AND APPARATUS FOR COMMUNICATING BETWEEN A SECURITY MODULE AND A HOST DEVICE

CROSS REFERENCE TO RELATED APPLICATIONS

This application claims priority under 35 U.S.C. Section 119 to U.S. Provisional Application No. 61/414,909, filed Nov. 18, 2010, the entire contents of which are hereby incorporated by reference herein.

INTRODUCTION

The present invention relates to the domain of radio frequency electromagnetic interference and more specifically to methods and devices for the reduction of such interference in electronic circuits.

STATE OF THE ART

With the increasing use of higher and higher signal frequencies in the operation of electronic circuits, the problems related to electromagnetic interference or EMI are becoming more acute. In the domain of conditional access, the use of a security module is commonplace. A security module is usually used in cooperation with a host device which comprises at least a card reader to interface with the security module. The host device may further comprise a cryptographic module and other related conditional access hardware and software. The security module holds personalised information such as cryptographic keys and the like, which need to be kept secret. The security module is generally a portable device which is detachable from the host device.

A common example of a security module is an electronic chip housed on a card, generally in the form of a credit card, a SIM card or a micro-SIM card or other similar support. The card is usually presented to the host module, or more particularly to the card reader within the host module, via a slot in the host module. Contact is made between the chip and the card reader by a set of contacts which come to rest on a set of corresponding contact pads on a surface of the card, which connect to the chip.

With the tendency for operating frequencies of the aforementioned security modules to be higher, i.e. in ranges in excess of several hundreds of megahertz, any connections to the security module which carry signals with frequency components in such ranges, namely connections to clock and data pins for example, will tend to emit electromagnetic radiation. Such electromagnetic radiation may be intercepted by a third party and used to breach the security of the security module. For example by monitoring the electromagnetic radiation during the time that the security module transmits a secret key, it may be possible for a third party to reconstruct the secret key for malicious purposes. Similarly, a security module may be susceptible to interference by sufficiently strong electromagnetic fields generated externally to the security module for the purpose of influencing the operation of the security module and/or card reader during operation. Such interference, generated either externally or internally by the security module or any of the other circuitry within the host during operation, is known as electromagnetic interference or EMI.

The EMI phenomenon is well known in the electronics industry. Indeed, there are industry-standard limits placed on electronic circuits relative to the amount of electromagnetic radiation such circuits are allowed to generate. These limits are designed to minimise the possibility of circuits susceptible to generating large quantities of EMI from affecting neighbouring circuits and to avoid the risk of physical harm to humans in the vicinity of such circuits. Such limits are set for various domains and types of circuits and published by bodies such as the Federal Communications Commission, the International Electrotechnical Commission or the National Telecommunications and Information Administration.

It is usual, in the domain of electronic circuits which are designed to operate at radio frequencies (RF), to enclose such circuits within a box whose walls are entirely covered by a material which has the properties of providing shielding against electromagnetic radiation. This generally provides sufficient protection against radiation produced by the circuit from escaping towards the outside of the enclosed box and against radiation generated outside of the box from penetrating into the box and interfering with the operation of the circuit.

However, in the case of a host device designed to receive a security module via a slot or port, it is difficult to prevent EMI from escaping since the port presents a discontinuity in the enclosure and therefore a discontinuity in the shielding thereby exposing an area where EMI may escape. United States Patent Publication number U.S. Pat. No. 7,351,919 B1 describes a port cover for limiting transfer of electromagnetic radiation from the port of a host device when the security module is functioning within the port. A port cover is mounted over the slot for the chip card after the chip card is entered. The port cover is lined with a conductive material, which contributes to the EMI shielding properties of the port cover and permits for an electrical circuit to be completed when the port cover is in position, thus allowing for the detection of whether or not the port cover is properly closed.

There also exist devices for providing a shield around electronic components susceptible to emitting EMI such as the device described in United States Patent Publication number U.S. Pat. No. 5,436,803 which teaches of a flexible envelope surrounding an electronic circuit card within the host device, the electronic circuit card comprising the offending component. The flexible envelope comprises an insulating sheet such as polyethylene and a sheet of conductive fibres such as metalised nylon giving a resistivity in the order of a tenth of an ohm. Another example is described in International Patent Application Publication number WO 2005/106953 A1, which discloses a screening layer, comprising a layer of soft magnetic material of high relative permeability such as iron, nickel or cobalt or any of their alloys, placed on the surface of the component susceptible to emit the offending EMI. The document further goes on to describe the use of a further layer of additional hard material, such as diamond-like carbon, on the surface of the offending component to prevent access to the component through mechanical or chemical means.

In United States Patent Publication number 6,223,298, a communications interface is disclosed, enabling a processor unit to dialogue with an IC card through a serial bus. This invention solves a problem whereby communication between the processor and the IC card is only possible at predetermined transmission rates, such rates being fixed by the serialization means of the interface and taking only a very limited number of values. Even with the processor working at nominal (usually high) speed, the rates are typically small. The invention therefore is aimed at allowing for the number of possible rates to be substantially higher and indeed for the values of the rates themselves to be close to the maximum operating frequency of the IC card, thereby possibly leading to the generation of EMI. This is useful for example in testing of the IC cards, where the tester (processor) has to be run at high speed. No regard is given as to the possible drawbacks of EMI being generated within such a system.

BRIEF SUMMARY OF THE INVENTION

EMI includes electromagnetic radiation which is emitted unintentionally from electronic devices and systems such as personal computers, personal digital assistants, media players, mobile telephones, etc. Within these devices and systems, periodic clock signals are a major contributor to the EMI which they radiate.

In a system comprising a CAM for performing secure operations, there may be a receiving portion to receive encrypted information, such as a piece of security-protected media content, a decryption portion to decrypt the encrypted information and a secure processing portion to carry out processes which need to be kept secure. Secure processes include the storage and the use of encryption keys, the disclosure of which would break the security of the system. In seeking to break the security of the system, unscrupulous third parties may attempt to security features such as encryption keys.

One method which is used by such third parties is to monitor EMI radiated from a secure system such as a CAM while the system is working. By analysing the EMI radiated by the system it may be possible for the third party to reconstruct all or part of a communication being made during the operation, such communication possibly leading to the discovery of encryption keys or other secure information.

The amount of EMI coming from a system depends partly on the frequency at which the system operates (the higher the frequency, the higher the level of EMI), the number of nodes within the system which operate at that frequency (each of such nodes adding a component to the total EMI) and the length of wire that such a node represents (the longer the wire, the more EMI it will radiate). On the other hand, in order for the security module to be able to operate such that optimum system performance is achieved, it must be able to operate at sufficiently high frequencies, such sufficiently high frequencies often being those which are susceptible to generating adverse amounts of EMI with respect to the ability of the eavesdropping third party to reconstruct a communication. It is therefore important that at least the security module operate at an optimum frequency, the optimum frequency being that which is sufficiently high to achieve a predetermined optimum system performance. For a system comprising a security module configured to operate at a predetermined optimum frequency, a goal of the present invention is therefore to reduce the number of wires in the system which operates at the optimum frequency. Another goal is to minimize the lengths of wires which operate at the optimum frequency. According to an embodiment of the present invention, only the clock pin and the data pin of the security module operate at the optimum frequency. Known measures can then be taken to minimize the remaining EMI coming from the clock pin and the data pin.

In a system in which an embodiment of the present invention is deployed, the job of an eavesdropping third party using a method of detection of EMI from a CAM during operation will be rendered more difficult than in a system in which no embodiments of the present invention are deployed.

In view of the prior art, it is an aim of the present invention to provide a means for reducing the amount of electromagnetic interference detectable from the outside of a host device while the host device is communicating with a security module, especially when the host device comprises a slot or port through which the security module is inserted. Implementation of embodiments of the present invention allow for reduction of EMI generated by a security module performing operations while in the host device to a level which precludes a third party from being able to reconstruct said operations based on detection of the EMI.

It is a further aim of the present invention to provide a means for reducing the amount of electromagnetic interference escaping from a security module towards electronic components comprised within a host device while the security module is communicating with the host device.

It is a further aim of the present invention to provide for such reduction in electromagnetic interference while retaining ease of physical access to the host device by the security module, thereby allowing ease of exchanging one security module for another. This requirement therefore precludes the possibility of using a port cover or a flexible envelope as described in the prior art as well as the use of screening layers around the security module. Additionally, an aim of the present invention is to reduce the manufacturing costs associated with the production of host devices intended to receive security modules which function at operating frequencies high enough to generate the undesired EMI and therefore the use of expensive screening layers such as those described in the prior art is not a desired option.

The aims of the present invention are therefore achieved using method for communicating, at a first frequency, between a security module housed on a chip card and a host device, said host device comprising a card reader for connecting to the security module via at least one communication line operating at a first frequency, said method comprising:

operating the host device at a second frequency, said second frequency being lower than the first frequency, said operation generating a plurality of signals toward the card reader, at least one of which having a third frequency, said third frequency being equal to or lower than the second frequency, the card reader receiving said plurality of signals; and converting by the card reader at least one of the received signals, said conversion giving at least one communication signal having the first frequency, said communication signal being used to drive the communication line.

The aims of the present invention are further realised by providing a host device comprising a card reader for connecting a security module to the host device, said security module being housed on a chip card, said connection being made via at least one communication line, said communication line being operated at a first frequency, said card reader adapted to receive a plurality of signals from the host device said host device characterised in that:

the card reader is adapted to process the plurality of signals at a second frequency, said second frequency being lower than the first frequency, said plurality of signals having a third frequency less than or equal to the second frequency; and the card reader comprises a converter module for converting at least one of the plurality of signals to give at least one communication signal having the first frequency, said communication signal being used to drive the communication line.

In a typical system comprising a smart card working with a host device such as a digital TV receiver for example, where the smart card is operated at 5 MHz according to the ISO 7816 Standard, embodiments of the present invention may be deployed, contributing to between 50 db and 60 db reduction of radiated EMI within the 30 kHz to 1 GHz range.

BRIEF DESCRIPTION OF THE DRAWINGS

The present invention will be better understood thanks to the detailed description which follows and the accompanying drawings, which are given as non-limiting examples of embodiments of the invention, where.

DETAILED DESCRIPTION

It is well known to those who are familiar with the domain of radio frequency (RF) electromagnetic interference (EMI) that a contributory variable in determining the amount of EMI that will be emitted from a wire is proportional to the length of that wire and that another contributory variable is the frequency content of a signal transported by the wire. In a preferred embodiment of the present invention it is therefore sought to minimise the length of any wires which carry such signals with high frequency content in the host device/security module ensemble and to minimise the number of such wires.

Figure 1:
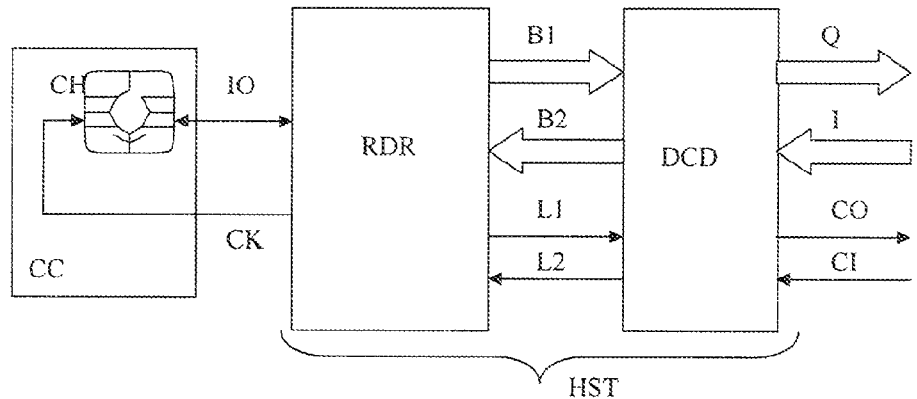
FIG. 1 shows a security module connected to a host device as exists in the state of the art.

FIG. 1 shows a security module connected to a host device. The security module is in the form of an electronic chip (CH) housed on a chip card (CC). This configuration is generally known in the state of the art. The security module or chip (CH) on its chip card (CC) is inserted into a slot in the host device (HST) and the chip's contact pads enter into contact with a set of contacts connected to the host device's card reader (RDR). For simplicity, the figure only shows the connection to the chip's input/output (IO) and clock (CK) pads. In actual fact the card reader would generally also come into contact with the chip's other pads such as reset, power supply, ground and memory programming pads for example. As will be seen later, when the invention is described, according to an embodiment of the present invention, since the input/output pad (IO) and the clock pad (CK) are the ones which carry signals of the highest frequency, particular attention is directed towards the treatment of connections going to these pads. FIG. 1 also shows a cryptographic module (DCD) in the host device (HST). The cryptographic module communicates with the reader via various busses and signals, represented by the illustrated bus lines (B1, B2) and signal lines (L1, L2). The cryptographic module produces outputs (Q, CO) to be further processed or to be sent outwith the host device (HST) and may also receive various busses and signals (I, CI) from outside of the host device (HST) or from other components within the host device (HST). Any or all of the signals described above may comprise high-frequency characteristics leading to the generation of EMI or leading to sensitivity towards incident EMI.

Figure 2:
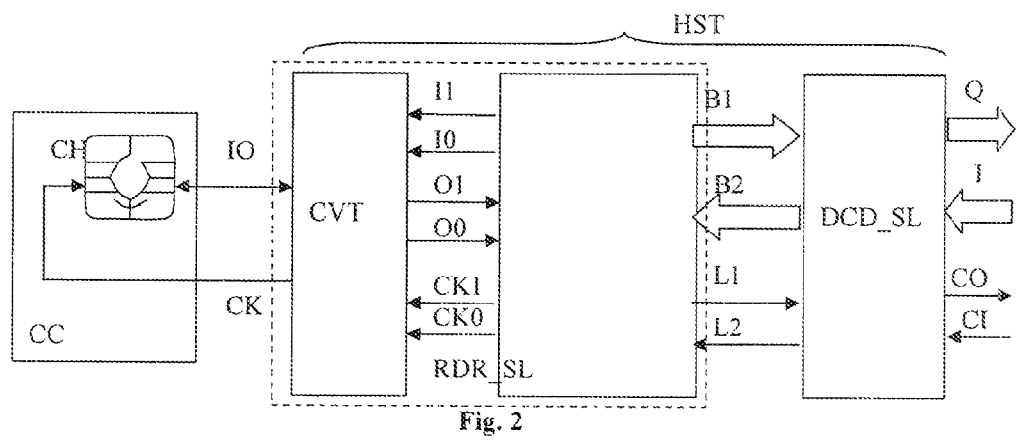
FIG. 2 shows security module connected to a host device according to an embodiment of the present invention.

FIG. 2 shows an embodiment of the present invention in which a converter module (CVT) has been introduced to the configuration shown in FIG. 1. The converter module (CVT) is used as an interface between the security module (CH) and the card reader (RDR_SL) and its purpose is to slow down the high frequency signals i.e. the input/output signal (IO) and the clock signal (CK) so that card reader (RDR_SL) and indeed any of the other circuits comprised in the host device may operate at a frequency which is low enough not to generate any EMI or at least to substantially reduce the amount of EMI which is generated. It is worth noting that as well as the signals between the card reader (RDR_SL) and the converter module (CVT) being slowed down, the other signals going between the card reader (RDR_SL) and any other modules in the host device will likewise be slowed down. As shown in the example depicted by FIG. 2, the converter module (CVT) outputs the clock signal (CK) to the security module (CH), which is converted from two separate sub-clock signals (CK1, CK0) coming from the card reader (RDR_SL), which is modified with respect to the card reader (RDR) of FIG. 1 to work at a lower frequency. Similarly, the input/output signal (IO) for the security module (CH) is converted from two separate inputs (I1, I0) from the card reader (RDR_SL) and to two separate outputs (O1,O0) to the card reader (RDR_SL). FIG. 2 also shows the card reader (RDR_SL) communicating with a decoder (DCD_SL), which consequently may also operate at a reduced frequency. For simplicity, FIG. 2 only shows the converter module (CVT) producing a one-to-two conversion for each line. In reality, in order to achieve much more substantial reductions in signal frequencies, the converter module would convert at a ratio of 8 to 1 or 16 to 1 or higher for example.

Figure 3:
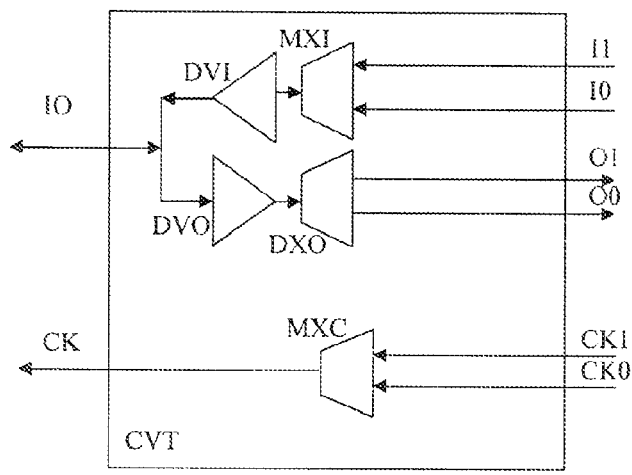
FIG. 3 shows a converter module as employed in an embodiment of the present invention.

FIG. 3 shows an example of an embodiment of the converter module (CVT) in greater detail. The clock signal (CK) for the security module is generated by multiplexing two separate, suitably phased sub-clock signals (CK1, CK0). Similarly, the input/output signal (IO) is multiplexed from two inputs (I1, I0) and de-multiplexed to produce two separate outputs (O1, O0). Again, the figure shows a simplified example of two lines being multiplexed onto one. The embodiment in general however allows for parallel busses of say 8 data bits plus a parity bit for example in the reader to be multiplexed onto one line by the converter module thus allowing the security module to work at the required higher frequencies whereas the card reader and other related circuitry in the host can run at significantly lower frequencies.

In order to further reduce the amount of EMI radiated from the host device, the cabling used for the busses and signals between the converter module (CVT) and the card reader (RDR_SL) may be of shielded type. Indeed, as a general rule, any of the inter-module cabling within the host device is preferably of a shielded type.

Figure 4:
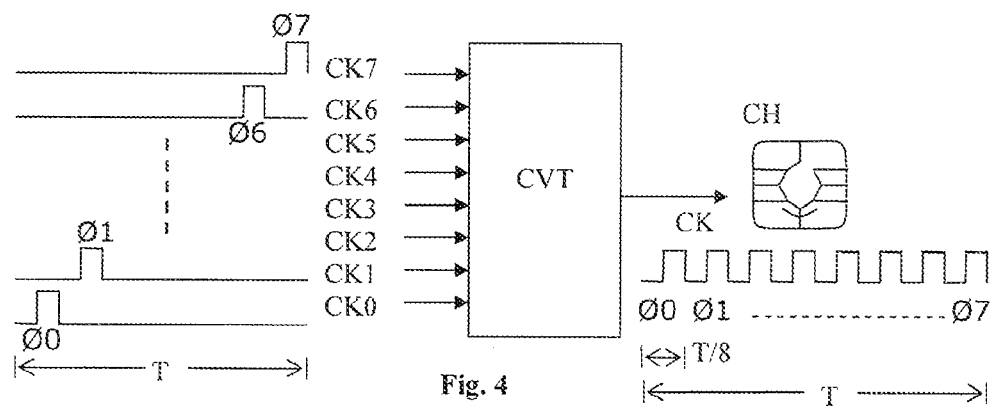
FIG. 4 illustrates how a conversion module according to an embodiment of the present invention converts a plurality of low frequency signals to form a high frequency signal.
Figure 5:
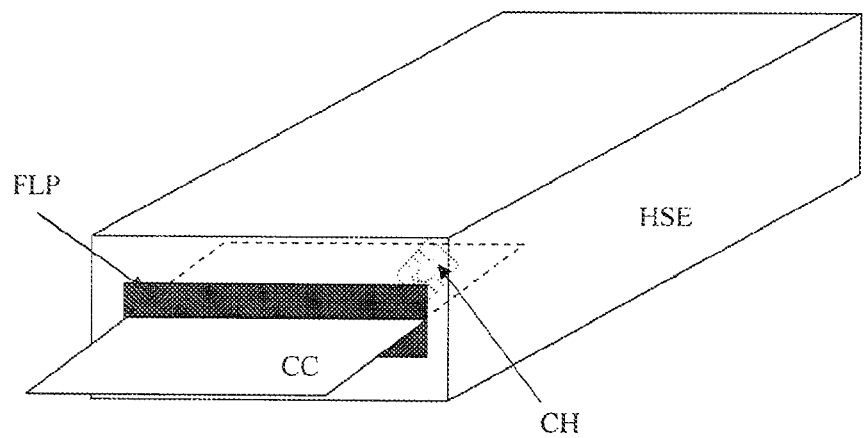
FIG. 5 shows a chip card with a security module inserted through a flap into a housing according to an embodiment of the present invention.

FIG. 4 shows an example, according to an embodiment of the present invention, of how the converter module (CVT) may produce a clock signal for the security module (CH) using eight sub-clock lines (CK7, CK6, ..., CK0). The clock signal (CK) has a clock period (t) and is generated by multiplexing eight sub-clocks (CK7, CK6, ..., CK0) each having a sub-clock period (T), which is eight times the clock period (t=T/8). The sub-clock period (T) is divided into eight separate phases (Ø7, Ø6, ..., Ø0). Each of the eight sub-clocks has one pulse during only one phase of the sub-clock period (T). In the example given for the described embodiment of the present invention, the eight phases are consecutive and non-overlapping. The pulses of each of the consecutive sub-clocks occur during consecutive phases. In this way, each consecutive sub-clock contributes to each consecutive pulse of the clock thereby producing the necessary clock frequency of eight times larger than the sub-clock frequencies. A similar method is used for the input part of the input/output line.

Eight different sub-input lines represent the state of the input/output line during eight consecutive phases of the clock (CK) and the eight sub-input lines are multiplexed onto the input/output (IO) pin. For example, for each sub-input line, during the phase where it is active it will give a pulse for a first logic state and no pulse for a second logic state. Similarly, the output part of the input/output pin, i.e. driven by the security module (CH) when the security module is in output mode, is time-multiplexed onto eight sub-output lines, each consecutive sub-output line representing the state of the input/output pin during consecutive phases of the clock (CK).

In order to further reduce any EMI generated from any of the sub-inputs, sub-outputs or sub-clocks, any of the known techniques may be further employed to reduce the slew rate of these lines. For example by making the lines resistive, the resulting related RC constant will contribute to slowing down the transients of the lines.

According to another embodiment of the present invention, rather than multiplexing lines as shown above, a multiplication technique is used so that lower frequencies can be used throughout the host until the higher frequencies are required at the security module. For example, whereas a security module is to operate at 100 MHz, the circuits within the host device may operate at a more modest frequency based on a reference clock of say 1 MHz, thereby producing substantially low amounts of EMI. The converter module (CVT) in this case comprises a frequency multiplier based on a phase locked loop for example, which is used to multiply the reference frequency by 100 for example in order to generate the higher frequency just where it is required for the security module.

According to an embodiment of the present invention, further techniques are employed to provide means to minimise the amount of EMI from penetrating from the interior of the host device to the exterior. As described above, for a host communicating with a high-speed security module, at least the security module's clock (CK) and input/output (IO) connections may be susceptible to producing significant amounts of EMI. The high-speed connections are kept as short as possible as it is known that the length over which a high frequency signal is present is a significant variable contributing to the amount of EMI emitted. Additionally, these lines are preferably made from shielded cabling.

According to yet another embodiment of the present invention, a shield is built to substantially reduce any EMI generated inside the host device from penetrating to the outside of the host. In this embodiment, the shield is in the form of a flap covering the port or slot of the host device through which the chip card which comprises the security module is inserted. The flap is made of an electrically conductive epoxy material or an electrically conductive resin and is suitably dimensioned and positioned so as to adequately enclose the chip card as it is inserted into the slot. In this manner, since the epoxy or resin exhibits elastic properties, a seal is formed around the chip card when it is inserted into the slot. Since the epoxy or resin is electrically conductive, the flap provides EMI shielding such that any EMI generated within the host device does not propagate outside of the host device or is at least substantially attenuated so as not to be considered a problem. According to variants of this embodiment of the invention, the flap may be formed by one sheet of the epoxy or resin, attached to either the top or bottom of the slot or the flap can be made from a larger sheet of the epoxy or resin with a slit cut near the middle of the sheet to receive the chip card or the flap may be realised by two sheets of epoxy or resin material, the two sheets being suitably fixed to the slot such that the edges of the two sheets come together thus forming the flap near the middle of the slot.

It is worth noting that the technical effect on the EMI afforded by any of the embodiments of the present invention serves not only to reduce the amount of EMI penetrating from the inside of the host device to the outside, but it further serves to reduce the amount of EMI penetrating into the host from outside and thereby reduces the possibility of the components within the housing being affected by interference from outside.

According to a further embodiment of the present invention, a reduction in the amount of EMI escaping from the inside of the host device towards the outside is achieved by making a housing for the host device, or at least for the components of the host device which are susceptible to producing EMI, from a conductive plastic material. These materials provide shielding for EMI due to their conductive properties and do not require the additional steps of adding conductive layers or conductive paint and therefore contribute towards minimising the manufacturing cost of a housing providing EMI shielding.

In another embodiment of the present invention, provision is made to shield the EMI generated by pathways carrying high frequency signals from contaminating other electronic circuits within the host device and from escaping outside of the host device. Preferably, if measures have been taken to minimise the number of pathways concerned and to reduce to reduce the lengths of such pathways to a minimum, then the aforementioned provision is readily realisable. In this embodiment, as well as making use of the shielding flap as described above to prevent EMI from escaping from the host, use is made of a shielding box which isolates those pathways carrying high frequency signals. For example, as mentioned in the previous examples, the two pathways input/output (IO) and clock (CK) require to be isolated. The offending pathways are geographically isolated and physically located in a region near the slot of the host, where they will come into contact with the security module. The flap (FLP) is used to isolate the EMI generated by the pathways from the outside of the host. This isolation is completed by the fact that the host is housed in either a metal box or a box made from conductive plastic as described above. This box is referred to as a housing. Furthermore, in order to isolate the EMI from the rest of the host's electronic components, a wall is made within the housing (HSE) either from metal or from conductive plastic to electromagnetically isolate the offending pathways from the rest of the circuitry in the host device. According to another embodiment, instead of simply forming a wall, the metal or conductive plastic may be shaped to enclose the offending pathways and connect to the flap, thus creating an EMI-impermeable box within the host device. Joints between the metal or conductive plastic are preferably sealed with electrically conductive epoxy resin as are gaps between the conductive plastic or metal and the flap thereby assuring a maximum isolation.

Conversely, or in combination, as in another embodiment of the present invention, instead of enclosing the offending pathways is an EMI-shielded enclosure, the rest of the circuits in the host device, which may be susceptible to EMI coming from the high-frequency pathways mentioned above, may be insulated from externally-generated EMI by covering them with EMI-shielding conductive epoxy or by wrapping them with EMI-shielding conductive tape. As with all of the techniques involving electrically conductive adhesives, tapes, resins or epoxies, such treatment may be part of a multi-layer treatment where alternating layers of non-conducting and conducting adhesives, tapes, resins or epoxies are applied.

If any of the mentioned high-speed pathways require to cover more than the minimum possible distance, it is preferable to convert such signals to a differential signal over two pathways located in close proximity—preferably adjacent to each other at minimum pitch or, if such pathways exist as wires, then as a twisted pair. The signals should preferably be of a current mode, of minimum common-mode voltage level and have a minimal voltage swing between logic states. A low-voltage differential protocol such as the communication protocol known as LVDS is well-suited for such pathways. According to another embodiment of the present invention, LVDS drivers are used to convert the clock signal from a single-ended wire to a two-ended differential current mode bus terminated with a hundred ohm resistor and conforming to the LVDS communication protocol. One end of the two-ended bus is used to drive the clock pad of the security module. Similar drivers are used to convert the input/output signal to be compatible with the LVDS protocol.

According to another embodiment, a security module comprises an interface whose pin-out complies with the ISO 7816 Standard, a processor and a voltage detector. The processor includes hardware to take care of certain security functions such as the decryption of ECMs and EMMs as is well known in the domain of digital TV broadcast, and furthermore includes hardware to take care of the decryption of received audio/video content. The output of the processor is sent to an external a video processing unit for processing.

The security module also cooperates with a clock signal generator which is external to the security module and may be placed for example in a card reader used for interfacing with the security module. According to an embodiment of a conditional access system for use in the Pay-TV domain, in which an embodiment of the present invention may be deployed, the clock signal generator is placed in a decoder. The decoder includes the smart card reader into which the security module is introduced when the assembly is in operation.

According to the ISO 7816 Standard, an interface complying with the Standard notably comprises eight contacts, which can be numbered from 1 to 8. According to a possible convention, the contact having reference 1 is the contact through which power supply is provided to the circuit. In the context of the present invention the circuit referred to here is the smart card or security module. Contact 2 allows for the resetting of the circuit. Contact 3 allows for a clock signal to be input to the circuit. Contact 5 provides the grounding of the circuit. Contact 6 provides a programming voltage to the circuit. Contact 7 allows data to be input to the circuit or output from the circuit. Contacts 4 and 8 are reserved for future use and can be considered to be unused when the circuit is operating in a mode compliant with the ISO 7816 communication protocol.

The circuit is adapted to be able to operate either in a first mode according to a communication protocol defined by the ISO 7816 Standard or in a second mode according to a communication protocol defined by a second standard whose frequency of operation is significantly higher than the frequency of operation of the first mode. Examples of such standards to which the second mode of operation complies are the USB Protocol or the LVDS protocol (Low Voltage Differential Signaling) or even a proprietary communication protocol. By way of example, typical frequencies of operation of an ISO 7816 type interface is of the order of 5 MHZ whereas the frequency of operation of a USB type interface is around 30 MHz. According to an embodiment of the present invention, the clock signal generator generates signals at a sufficiently high frequency to allow the security module to operate in the mode requiring the higher of the two operating frequencies.

In order to ensure the precision necessary for reliable operation of the circuit in the operation mode requiring the higher operating frequency, the clock signal is generated externally to the security module and transmitted to the security module via the Contact 3 of the ISO 7816 type interface. In this way there is no conflict between the requirements to mass produce reliable smart cards and the requirement to produce a highly accurate clock generator.

In order for the circuit to be able to function at the lower of the two operating frequencies, i.e. when it is operating in the mode compliant with the ISO 7816 Standard, the security module further comprises a frequency divider. As mentioned, this frequency is generally in the range of 3 to 5 MHz. As it is well known, the frequency divider can be realised by means of a counter configured to allow a frequency at the input of the divider to be divided by any whole value, or by means of successive stages of frequency dividers dividing the frequency by 2, thus allowing the input frequency to be divided by powers of 2. The frequency divider can also be arranged to divide the frequency of the signal at its input in order to make it compatible with the higher frequency mode if the frequency of the clock signal generated by the clock signal generator is too high for this mode.

The output of the frequency divider is connected, via a multiplexer, to Contact 3 of the ISO 7816 type interface in order to provide the circuit with the required clock signal. The multiplexer allows for the output of the clock signal generator to go either directly to the chip, or indirectly, that is to say after passing through the frequency divider, according to the generated frequency and to the required frequency. It is also possible to use a frequency divider capable of carrying out different divisions according to necessity. According to a practical example, the generated frequency could be divided by 12 in order to allow the circuit to operate in ISO 7816 mode and by 2 to allow the circuit to operate in a higher frequency mode such as USB mode for example or some other proprietary higher frequency communication protocol.

The security module according to the invention also includes a voltage detector arranged to determine the value of the power supply used or at least to distinguish a range to which the power supply voltage belongs according to a predefined set of voltage ranges. According to one embodiment of the present invention three voltage ranges are predefined and the voltage detector is capable of distinguishing the detected supply voltage as belonging to one of the three ranges, namely 2.25V-2.75V (LV), 3V-3.6V (MV) or 4.5V-5.5V (HV). Ideally, the three voltage ranges are separated, so that there is no risk of confusion possible between them. According to the embodiment of the present invention, when the circuit is operating in a mode compatible with the ISO 7816 Class A protocol, the power supply will be within the highest of the three voltage ranges (HV). Similarly, when the circuit is operating in a mode compatible with the ISO 7816 Class B protocol, the power supply will be within the mid voltage range (MV). When the circuit is operating in a mode compatible with a second protocol, having a higher frequency than the ISO 7816 protocol, the power supply will be within the lowest of the three voltage ranges (LV). The voltage detector can therefore be used to determine the mode of operation of the circuit. According to the determined mode of operation of the circuit, the multiplexer is controlled in such a way as to switch the appropriate clock signal to the processor.

According to another embodiment in which the security module of the present invention includes a frequency multiplier in place of the divider, instead of using a clock signal generator that provides a frequency compatible with the operating mode requiring the highest frequency, the generator provides a signal having the lowest frequency. This signal can be sent directly to the processor in the case of operating according to the ISO 7816 Standard or can be sent to the frequency multiplier. The latter then multiplies the frequency by a value that makes it compatible with operating in USB mode or in LVDS mode or some other proprietary mode.

In the examples mentioned in the present application, it is indicated that the frequency in USB mode is 30 MHz. According to the frequency of the clock generator and the characteristics of the multiplier, the frequency with which the contact CLK of the chip is provided can be different to 30 MHz. Such a different frequency could be used since the decoder and the smart card both use the same frequency.

Another embodiment is possible in which a combination of the embodiments of the previous embodiments is made. In this case the security module includes both a frequency divider and multiplier.

This security module presents the advantage that it can be used indifferently with an apparatus generating a clock frequency compatible with the ISO 7816 protocol or with an apparatus generating a clock frequency compatible with a protocol using a higher frequency than the ISO 7816 protocol. When the generated frequency corresponds to mode requiring the higher frequency, the invention device uses the frequency divider to generate the clock frequency compatible with ISO 7816 mode. When the generated clock frequency corresponds to ISO 7816 mode, the device uses the frequency multiplier to generate a high frequency corresponding to the mode which is compatible with higher operating frequencies.

It is also possible to make provision for the signals generated by the clock signal generator to have an intermediate frequency between the frequency used in ISO 7816 mode and that corresponding to USB mode, for example 15 MHz. In this case, when the device operates in ISO 7816 mode, the signals of the clock signal generator are transmitted to the frequency divider before being sent to the card. On the contrary, when the device operates in USB mode, the signals of the generator are sent to the frequency multiplier before being sent to the card.

According to a variant, the smart card can support different serial communication modes such as for example USB and LVDS. The clock signal can be generated at a frequency required by the communication mode requiring the lowest frequency, i.e. the ISO 7816 mode. In this case, a first multiplication stage is used to generate a frequency that is compatible with the intermediate mode, i.e. the USB mode in our example. A second multiplication stage is further used to generate a higher frequency that is compatible with the mode requiring the highest frequency, i.e. the LVDS mode.

It is also possible to generate an intermediate frequency and to use a frequency divider to generate a lower frequency and a frequency multiplier to generate a higher frequency. Similarly, it is possible to generate a frequency at least as high as the frequency required for the mode requiring the highest frequency and to use two dividers to generate lower frequencies.

When the security device has determined in which operating mode it must work, it carries out the required operations in a conventional way. As soon as the clock frequency has changed, the operating mode also changes and the processing of the information is adapted consequently.

In the device according to the invention, there is no particular management of the operating mode of the processor. It is only necessary to act on changes to the power supply voltage to the power supply contact of the security module (and thereby acting on the clock frequency seen by the security module) after the initial detection and mode selection on power up so that changes in the operating mode are immediately or rapidly detected and the new operating mode is immediately or rapidly selected. In this way the detection and therefore the mode switching can be done on a continuous basis while the security module is operating. Detection on a "continuous basis" includes generally detecting on a frequent basis, as described hereafter, during the operation of the security module. In embodiments for use in a Pay TV application and targeted towards switching the mode of operation relative to the speed capability of an interface, "on a frequent basis" can mean at intervals compatible with a possible switching of operation from one mode to another, such as when switching between reception of content from one operator or channel to reception of content from another operator or channel for example. It will be understood by the man of ordinary skill in the art that detection of a change in the power supply voltage and switching to the corresponding new mode of operation should be performed quickly so that the switching delay is tolerable to a user and more preferably should be performed so that the switching delay is not noticeable to the user. The frequency could then be described in terms of an event driven phenomenon such as changing between channels for example. In other embodiments of the present invention the voltage detection could be executed on a periodic or polled basis such as every two seconds or every quarter of a second for example. This presents the advantage that it is possible to change the operating mode very frequently, which is necessary in particular in an application such as Pay-TV in which the change between the processing of the data stream requiring operating in USB, LVDS or other higher frequency modes and processing the control messages requiring operating in ISO 7816 mode is frequent and must be fast. In other words, upon power on of the device or at some predetermined time following startup, as part of a bootstrap process for example, the voltage on the power supply pin is detected and depending on the category to which that measured voltage belongs the device is made to function according to one of the predetermined operating modes. During the functioning of the device, if the supply voltage moves and is detected as belonging to a different category, then the device is caused to switch to another of the predetermined operating modes. This process continues whereby any time the supply voltage changes to be in another category the device is switched to function according to another operation mode.

The present invention has been described with reference to an embodiment in which the security device takes the form of a smart card. It is however also possible for this device to take another form, for example the form of a key or of any object.

According to a particular case, it is possible to foresee that one of the operating modes, for example the USB mode, is inactive by default and that it is necessary to send a particular command to activate this mode.

According to an embodiment of the present invention, using the same physical connections as discussed above, communication between a host device and a security module according to one of a plurality of different communication protocols involving substantially different clocking frequencies is facilitated. According to this embodiment, a negotiation between the host device and the security module is carried out. Indeed, whenever the smartcard reader starts up or whenever the smartcard is inserted into the reader of the host device, the two mentioned parties communicate their respective capabilities with each other via a predefined protocol. Using the data relative to the capabilities, it is a simple task for a processor in the host device or a processor on the smartcard to determine the best set of working conditions which will be acceptable to both parties. The resulting best conditions would result in a communication session being set up between both parties, which could range anywhere from a low-speed legacy ISO 7816 protocol to a very high speed protocol. This process is known as negotiation. The power supply voltage imposed by the card reader will then be chosen as a result of this negotiation in order to set the power supply to the appropriate range for the negotiated communication frequency.

According to this embodiment of the present invention, the negotiation between the two parties results in the card reader determining a voltage level to be used for the power supply pad, thereby forcing the protocol to one of the predetermined protocols based on the power supply voltage detected by the smartcard.

Another solution to the problem of having a host device automatically adjusting itself to operate according to a communication protocol or operating mode involves the use of a separate pad or pads other than the eight pads on a standard ISO 7816 interface. According to this solution, the smartcard features two physically separate pads—one for low-bandwidth communication and one for high-bandwidth communication. The first of these two pads could be one of the already existing communication pads from the standard ISO 7816 interface for example. This first pad would be used for low-bandwidth communication. The second pad would be used for high-bandwidth communication and would be positioned close to the chip but at a position which would allow a card reader to detect that it is an extra pad, distinct from the first pad. When the smartcard reader starts up or when the smartcard is inserted into an active reader, the reader detects the positions of the second pad relative to the first one i.e. the standard one. According to a predefined protocol, the position of the second extra pad relative to the position of the first pad gives a code which correlates to the bit rate or clock rate capabilities of the module on the card. In this way the reader can be informed as to the best data rate it can use in communicating with the module and switch to that rate. In general, the second pad should be very close to the smartcard chip and could even be placed on the opposite side of the card for example.

According to another embodiment of the present invention with the extra pad as described above, the negotiation is achieved through the detection of the position of the second pad by the card reader. The result of this negotiation indicates to the reader that it should set the power supply voltage pad to one of the pre-defined voltage ranges, thereby setting the reader into one of the predefined communication protocols so that the communication between the card and the reader can continue at the required bit-rate.

The invention claimed is:

1. A method for communicating, at a first frequency, between a security module housed on a chip card and a card reader for connecting to the security module via at least one communication line, the security module operating with signals having a first period, said method comprising:
   operating the card reader at a second frequency, said second frequency being lower than the first frequency, said operation generating a plurality of signals each having a second period on a plurality of lines, the second period being greater than the first period;
   converting, in a converter module, the plurality of signals having the second period to a signal having the first period, said conversion involving multiplexing the plurality of signals on the plurality of lines together; and
   driving the communication line using the converted signal having the first period.

2. A host device comprising a card reader for connecting a security module housed on a chip card to the host device, said connection being made via at least one communication line for communicating between the security module and the card reader at a first frequency, said card reader adapted to receive a plurality of signals from the host device, the security module operating with signals having a first period, wherein:
   the host device is adapted to operate at a second frequency, said second frequency being lower than the first frequency, said operation generating a plurality of signals each having a second period on a plurality of lines, the second period being greater than the first period; and
   the card reader comprises a converter module for converting the plurality of signals having the second period to a signal having the first period and for driving the communication line using the converted signal having the first period, said converter module comprising means for multiplexing the plurality of signals on the plurality of lines together.

3. The host device according to claim 2, wherein said communication line is made from cable which is adapted to provide electromagnetic shielding.

4. The host device according to claim 2, wherein a shield is built around the host device, said shield adapted to shield the host from electromagnetic interference generated outside of the host.

5. The host device according to claim 2, wherein the host device comprises a housing, said housing comprising conductive plastic material.

6. The host device according to claim 2, wherein said communication line is enclosed within a box configured to provide a shield to electromagnetic interference.

7. The host device according to claim 2, wherein all components comprising the host device, apart from the communication line, are enclosed within a box which provides a shield to electromagnetic interference.

8. The host device according to claim 2, wherein said communication line comprises a differential pair.

9. The host device according to claim 8, wherein the differential pair is adapted to operate in a current mode.

10. The host device according to claim 9, wherein the differential pair is adapted to operate according to a LVDS low-voltage differential protocol.

* * * * *